United States Patent [19]
Takayama et al.

[11] Patent Number: 6,002,690
[45] Date of Patent: Dec. 14, 1999

[54] TIME DIVISION MULTIPLEX TRANSFERRING SYSTEM CAPABLE OF INCREASING TRANSFERRING EFFICIENCY AND PREVENTING INTERRUPTION OF COMMUNICATION

[75] Inventors: Shigeyuki Takayama, Shizuoka; Hideaki Funae, Tokyo, both of Japan

[73] Assignee: NEC Corporation, Japan

[21] Appl. No.: 08/842,073

[22] Filed: Apr. 24, 1997

[30] Foreign Application Priority Data

Apr. 25, 1996 [JP] Japan .................................. 8-105205

[51] Int. Cl.$^6$ .................................................. H04L 12/50
[52] U.S. Cl. .......................................... 370/437; 370/468
[58] Field of Search .................................. 370/468, 442, 370/443, 465, 477, 447, 458, 412, 230, 437, 395

[56] References Cited

U.S. PATENT DOCUMENTS

| 5,638,371 | 6/1997 | Raychaudhuri | 370/347 |
| 5,675,576 | 10/1997 | Kalampoukas | 370/232 |
| 5,684,791 | 11/1997 | Raychaudhuri | 370/278 |
| 5,825,766 | 10/1998 | Kobayashi et al. | 370/395 |
| 5,850,398 | 12/1998 | King, Jr. | 370/412 |

FOREIGN PATENT DOCUMENTS

| 59154846 | 9/1984 | Japan . |
| 4040135 | 2/1992 | Japan . |

OTHER PUBLICATIONS

Office action issued by the Japanese patent office on Oct. 20, 1998 and an english translation therefor.

Primary Examiner—Chi H. Pham
Assistant Examiner—Brenda H. Pham
Attorney, Agent, or Firm—Ostrolenk, Faber, Gerb & Soffen, LLP

[57] ABSTRACT

In a time division multiplex transferring system which uses fixed setting, on-demand, and frame relay bandwidths, a first time switch allocates the on-demand and frame relay bandwidths in response to a first allocation setting datum to produce two output signals. A second time switch allocates the on-demand and frame relay bandwidths in response to a second allocation setting datum to produce two output signals. A bandwidth allocation controlling device produces and renews the first and second allocation setting data in response to the connectivity restriction to produce and transmit a first allocation change datum to a counter node. The bandwidth allocation controlling device thereafter produces a first allocation end signal in response to a second allocation end signal from the counter node. The bandwidth allocation controlling device renews the first and second allocation setting data in response to a second allocation change datum from the counter node and thereafter produces and supplies the first allocation end signal to the counter node. A bandwidth switch controlling device produces a first switch signal in response to the first allocation end signal and produces a second switch signal in response to a second switch bit. A selector selects and transmits one of the output signals of the time switches in response to the first and second switch signals, respectively.

10 Claims, 5 Drawing Sheets

TIME DIVISION MULTIPLEX TRANSFERRING SYSTEM CAPABLE OF INCREASING TRANSFERRING EFFICIENCY AND PREVENTING INTERRUPTION OF COMMUNICATION

BACKGROUND OF THE INVENTION

This invention relates to a time division multiplex transferring system, and more particularly, to a time division multiplex transferring system which uses a fixed setting bandwidth, an on-demand bandwidth, and a frame relay bandwidth.

DESCRIPTION OF THE RELATED ART

A conventional time division multiplex transferring system uses the fixed setting bandwidth, the on-demand bandwidth, and the frame relay bandwidth. The fixed setting bandwidth is used for a dedicated terminal line in which a traffic does not change. The on-demand bandwidth is used for an on-demand terminal line in which the traffic changes. The frame relay bandwidth is used for a frame relay terminal line in which the traffic changes. An allocation of bandwidths of transferring lines in the conventional time division multiplex transferring system is predetermined and fixed in response to numerals and a transferring rate of the fixed setting bandwidth, the on-demand bandwidth, and the frame relay bandwidth. For example, a predetermined bandwidth is always allocated regardless of a demand request from the on-demand terminal line.

However, an evacuated line is caused in response to a state of the traffic in the on-demand bandwidth. Also, if a line becomes full, overflow of a connectivity restriction of a demand request signal is caused. As result, transfer efficiency is negatively impacted. Also, an operator changes a bandwidth setting datum which sets a bandwidth allocation. In this event, a signal in a station is not synchronized with a signal in a counter station. Therefore, communication is interrupted.

SUMMARY OF THE INVENTION

It is therefore an object of this invention to provide a time division multiplex transferring system which is capable of preventing an evacuated line.

It is another object of this invention to provide a time division multiplex transferring system which is capable of preventing overflow of a connectivity restriction.

It is still another object of this invention to provide a time division multiplex transferring system which is capable of increasing transferring efficiency.

It is a further object of this invention to provide a time division multiplex transferring system which is capable of preventing interruption of a communication.

Other objects of this invention will become clear as the description proceeds.

According to a first aspect of this invention, there is provided a time division multiplex transferring system which uses a fixed setting bandwidth, an on-demand bandwidth, and a frame relay bandwidth, the fixed setting bandwidth being used for a dedicated terminal line in which the traffic does not change, the on-demand bandwidth being used for an on-demand terminal line in which the traffic changes, the frame relay bandwidth being used for a frame relay terminal line in which the traffic changes, the time division multiplex transferring system comprising:

allocating means for allocating the on-demand bandwidth and the frame relay bandwidth by determining a ratio of the on-demand bandwidth and the frame relay bandwidth in response to a connectivity restriction from the on-demand terminal line.

According to a second aspect of this invention, there is provided a time division multiplex transferring system which uses a fixed setting bandwidth, an on-demand bandwidth, and a frame relay bandwidth, the fixed setting bandwidth being used for a dedicated terminal line in which a traffic does not change, the on-demand bandwidth being used for an on-demand terminal line in which the traffic changes, the frame relay bandwidth being used for a frame relay terminal line in which the traffic changes, the time division multiplex transferring system comprising a node which comprises:

a first time switch supplied with a received signal and a first allocation setting datum for allocating the on-demand bandwidth and the frame relay bandwidth to the received signal in response to the first allocation setting datum to produce a first time switch output signal;

a second time switch supplied with the received signal and a second allocation setting datum for allocating the on-demand bandwidth and the frame relay bandwidth to the received signal in response to the second allocation setting datum to produce a second time switch output signal;

a bandwidth allocation controlling device supplied with a demand request signal having a connectivity restriction for producing and renewing the first and second allocation setting data in response to the connectivity restriction and thereafter producing an allocation end signal representing an end of producing and renewing the first and second allocation setting data;

a bandwidth switch controlling device supplied with the allocation end signal for producing a switch signal; and a selector supplied with the first and second time switch output signals and the switch signal for selecting one of the first and second time switch output signals in response to the switch signal to transmit the one of the first and second time switch output signals as a transmitting signal.

According to a third aspect of this invention, there is provided a time division multiplex transferring system which uses a fixed setting bandwidth, an on-demand bandwidth, and a frame relay bandwidth, the fixed setting bandwidth being used for a dedicated terminal line in which the traffic does not change, the on-demand bandwidth being used for an on-demand terminal line in which the traffic changes, the frame relay bandwidth being used for a frame relay terminal line in which the traffic changes, the time division multiplex transferring system comprising a node and a counter node which is similar to the node, the node comprising:

a first time switch supplied with a first received signal having a first switch bit, a second received signal having a second switch bit, and a first allocation setting datum for allocating the on-demand bandwidth and the frame relay bandwidth to the first and second received signals in response to the first allocation setting datum to produce first primary and secondary time switch output signals;

a second time switch supplied with the first and second received signals and a second allocation setting datum for allocating the on-demand bandwidth and the frame relay bandwidth to the first and second received signals in response to the second allocation setting datum to produce second primary and secondary time switch output signals;

a bandwidth allocation controlling device supplied with a demand request signal having a connectivity restriction for producing and renewing the first and second allocation setting data in response to the connectivity restriction to produce a first allocation change datum to transmit the first allocation change datum to the counter node, the bandwidth allocation controlling device thereafter producing a first allocation end signal representing an end of producing and renewing the first and second allocation setting data when the bandwidth allocation controlling device is supplied with a second allocation end signal from the counter node, the bandwidth allocation controlling device renewing the first and second allocation setting data in response to a second allocation change datum from the counter node and thereafter producing the first allocation end signal to supply the first allocation end signal to the counter node;

a bandwidth switch controlling device supplied with the first allocation end signal and the second switch bit of the second received signal for producing a first switch signal in response to the first allocation end signal and for producing a second switch signal in response to the second switch bit;

a first selector supplied with the first and second primary time switch output signals and the first switch signal for selecting one of the first and second primary time switch output signals in response to the first switch signal to transmit the one of the first and second primary time switch output signals as a first transmitting signal; and a second selector supplied with the first and second secondary time switch output signals and the second switch signal for selecting one of the first and second secondary time switch output signals in response to the second switch signal to transmit the one of the first and second secondary time switch output signals as a second transmitting signal.

According to a fourth aspect of this invention, there is provided a time division multiplex transferring system which uses a fixed setting bandwidth, an on-demand bandwidth, and a frame relay bandwidth, the fixed setting bandwidth being used for a dedicated terminal line in which the traffic does not change, the on-demand bandwidth being used for an on-demand terminal line in which the traffic changes, the frame relay bandwidth being used for a frame relay terminal line in which the traffic changes, the time division multiplex transferring system comprising a node which comprises:

a time switch supplied with a received signal and an allocation setting datum for allocating the on-demand bandwidth and the frame relay bandwidth to the received signal in response to the first allocation setting datum to produce and transmit a time switch output signal as a transmitting signal;

a first address control memory device for holding a primary allocation setting datum;

a second address control memory device for holding a secondary allocation setting datum;

a bandwidth allocation controlling device supplied with a demand request signal having a connectivity restriction for producing and renewing the primary and secondary allocation setting data in response to the connectivity restriction to set the primary and secondary allocation setting data to the first address control memory devices, respectively, the bandwidth allocation controlling device thereafter producing an allocation end signal representing an end of setting the first and second allocation setting data;

a bandwidth switch controlling device supplied with the allocation end signal for producing a switch signal; and a selector supplied with the primary and secondary allocation setting data from the first and second address control memory devices and the switch signal for selecting one of the first and second allocation setting data in response to the switch signal to supply the one of the first and second allocation setting data, as the allocation setting datum, to the time switch.

According to a fifth aspect of this invention, there is provided a time division multiplex transferring system which uses a fixed setting bandwidth, an on-demand bandwidth, and a frame relay bandwidth, the fixed setting bandwidth being used for a dedicated terminal line in which a traffic does not change, the on-demand bandwidth being used for an on-demand terminal line in which the traffic changes, the frame relay bandwidth being used for a frame relay terminal line in which the traffic changes, the time division multiplex transferring system comprising a node and a counter node which is similar to the node, the node comprising:

a first time switch supplied with a first received signal having a first switch bit and a first allocation setting datum for allocating the on-demand bandwidth and the frame relay bandwidth to the first received signal in response to the first allocation setting datum to produce and transmit a first time switch output signal as a first transmitting signal;

a second time switch supplied with a second received signal and a second allocation setting datum for allocating the on-demand bandwidth and the frame relay bandwidth to the second received signal in response to the second allocation setting datum to produce and transmit a second time switch output signal as a second transmitting signal;

a first address control memory device for holding a primary allocation setting datum;

a second address control memory device for holding a secondary allocation setting datum;

a bandwidth allocation controlling device supplied with a demand request signal having a connectivity restriction for producing and renewing the primary and secondary allocation setting data in response to the connectivity restriction to set the primary and secondary allocation setting data to the first and second address control memory devices, respectively, to produce a first allocation change datum to transmit the first allocation change datum to the counter node, the bandwidth allocation controlling device thereafter producing a first allocation end signal representing an end of setting the primary and secondary allocation setting data when the bandwidth allocation controlling device is supplied with a second allocation end signal from the counter node, the bandwidth allocation controlling device renewing the primary and secondary allocation setting data of the first and second address control memory devices in response to a second allocation change datum from the counter node and thereafter producing the first allocation end signal to supply the first allocation end signal to the counter node;

a bandwidth switch controlling device supplied with the first allocation end signal and the second switch bit of the second received signal for producing a first switch signal in response to the first allocation end signal and for producing a second switch signal in response to the second switch bit;

a first selector supplied with the primary and secondary allocation data from the first and second address control memory devices and the first switch signal for selecting one of the primary and secondary allocation data in response to the first switch signal to supply the one of the primary and secondary allocation data, as the first allocation datum, to the first time switch; and a second selector supplied with the primary and secondary allocation data from the first and second address control memory devices and the second switch signal for selecting one of the primary and secondary allocation data in response to the second switch signal to supply the one of the primary and secondary allocation data, as the second allocation datum, to the second time switch.

DESCRIPTION OF THE PREFERRED EMBODIMENTS

Referring to FIGS. 1, 2A, 2B, and 3, the following is a description of a time division multiplex transferring system according to a first embodiment of this invention. The time division multiplex transferring system uses a fixed setting bandwidth, an on-demand bandwidth, and a frame relay bandwidth. The fixed setting bandwidth is used for a dedicated terminal line (not shown) in which traffic does not change. The on-demand bandwidth is used for an on-demand terminal line (not shown) in which the traffic changes. The frame relay bandwidth is used for a frame relay terminal line (not shown) in which the traffic changes.

Figure 1:
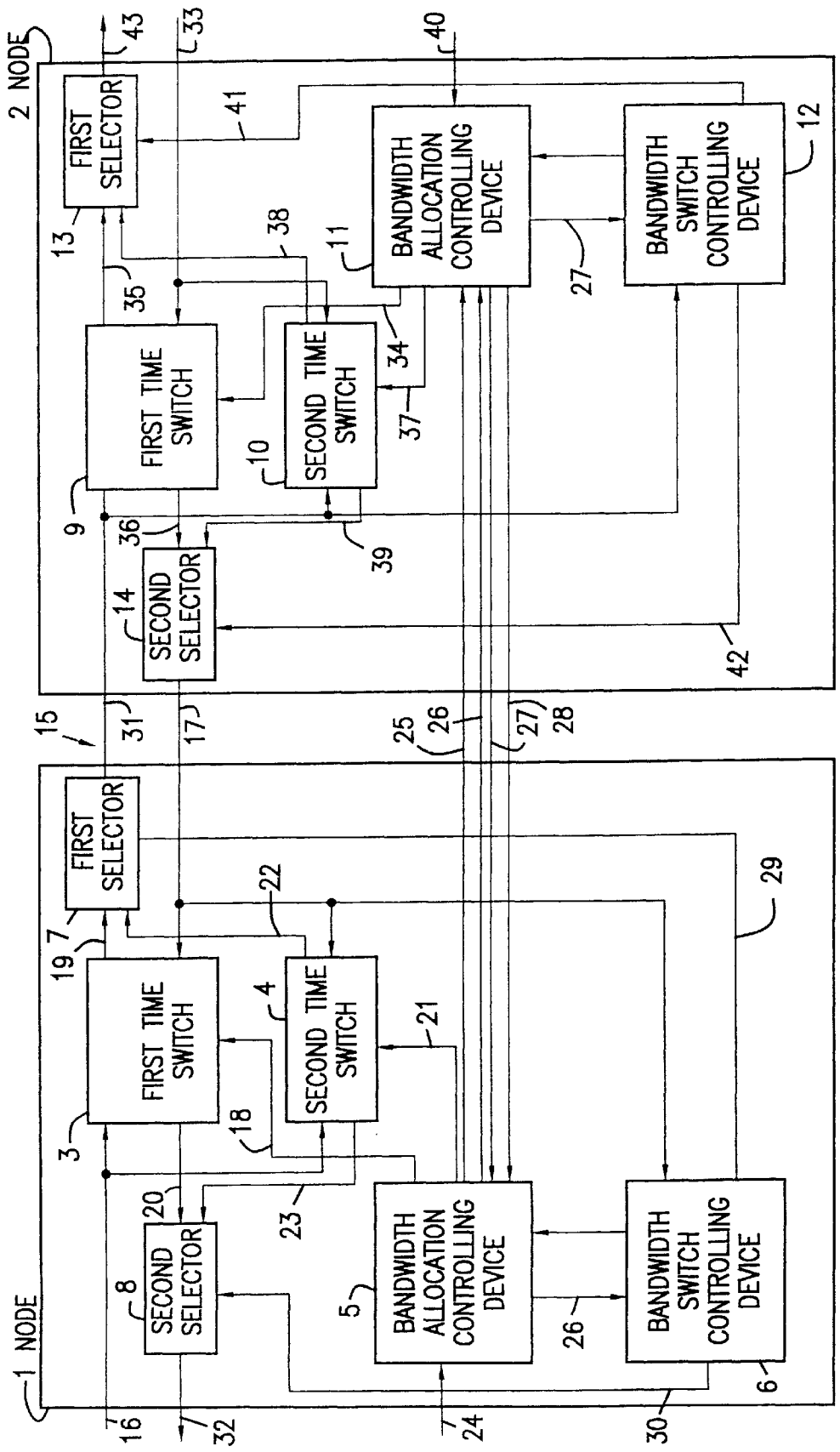
FIG. 1 is a block diagram of a time division multiplex transferring system according to a first embodiment of this invention.

In FIG. 1, the time division multiplex transferring system comprises a node 1 and a counter node 2. The node 1 comprises a first time switch 3, a second time switch 4, a bandwidth allocation controlling device 5, a bandwidth switch controlling device 6, a first selector 7, and a second selector 8. The counter node 2 is similar to the node 1. The counter node 2 comprises a first time switch 9, a second time switch 10, a bandwidth allocation controlling device 11, a bandwidth switch controlling device 12, a first selector 13, and a second selector 14. The counter node 2 is connected to the node 1 through transferring lines 15.

The first time switch 3 is connected to the bandwidth allocation controlling device 5. The first time switch 3 is supplied with a first received signal 16 having a first switch bit, a second received signal 17 having a second switch bit, and a first allocation setting datum 18. The first time switch 3 allocates the on-demand bandwidth and the frame relay bandwidth to the first and second received signals 16 and 17 in response to the first allocation setting datum 18 to produce first primary and secondary time switch output signals 19 and 20. The second time switch 4 is connected to the bandwidth allocation controlling device 5. The second time switch 4 is supplied with the first and second received signals 16 and 17 and a second allocation setting datum 21. The second time switch 4 allocates the on-demand bandwidth and the frame relay bandwidth to the first and second received signals 16 and 17 in response to the second allocation setting datum 21 to produce second primary and secondary time switch output signals 22 and 23.

The bandwidth allocation controlling device 5 is connected to the first time switch 3, the second time switch 4, the bandwidth switch controlling device 6, the first selector 7, and the second selector 8. The bandwidth allocation controlling device 5 is supplied with a first demand request signal 24 having a connectivity restriction from the on-demand terminal line. The bandwidth allocation controlling device 5 produces and renews the first and second allocation setting data 18 and 21 in response to the connectivity restriction to produce a first allocation change datum 25 to transmit the first allocation change datum 25 to the bandwidth allocation controlling device 11 of the counter node 2. The bandwidth allocation controlling device 5 thereafter produces a first allocation end signal 26 representing an end of producing and renewing the first and second allocation setting data 18 and 21 when the bandwidth allocation controlling device 5 is supplied with a second allocation end signal 27 from the bandwidth allocation controlling device 11. The bandwidth allocation controlling device 5 renews the first and second allocation setting data 18 and 21 in response to a second allocation change datum 28 from the bandwidth allocation controlling device 11 of the counter node 2. In this event, the bandwidth allocation controlling device 5 thereafter produces the first allocation end signal 26 to supply the first allocation end signal 26 to the bandwidth allocation controlling device 11 and the bandwidth switch controlling device 6.

The bandwidth switch controlling device 6 is connected to the bandwidth allocation controlling device 5 and the first selector 7, the second selector 8, and the second selector 14. The bandwidth switch controlling device 6 is supplied with the first allocation end signal 26 and the second switch bit of the second received signal 17. The bandwidth switch controlling device 6 produces a first switch signal 29 in response to the first allocation end signal 26. Also, the bandwidth switch controlling device 6 produces a second switch signal 30 in response to the second switch bit of the second received signal 17.

The first selector 7 is connected to the first and second time switches 3 and 4 and the bandwidth switch controlling device 6. The first selector 7 is supplied with the first and second primary time switch output signals 19 and 22 and the first switch signal 29. The first selector 7 selects one of the first and second primary time switch output signals 19 and 22 in response to the first switch signal 29 to transmit the one of the first and second primary time switch output signals 19 and 22 as a first transmitting signal 31. The second selector 8 is connected to the first and second time switches 3 and 4 and the bandwidth switch controlling device 6. The second selector 8 is supplied with the first and second secondary time switch output signals 20 and 23 and the second switch signal 30. The second selector 8 selects one of the first and second secondary time switch output signals 20 and 23 in response to the second switch signal 30 to transmit the one of the first and second secondary time switch output signals 20 and 23 as a second transmitting signal 32.

The first time switch 9 is connected to the bandwidth allocation controlling device 11. The first time switch 9 is supplied with the first transmitting signal 31, as a first received signal 31, having the first switch bit, a second received signal 33 having the second switch bit, and a first allocation setting datum 34. The first time switch 9 allocates the on-demand bandwidth and the frame relay bandwidth to the first and second received signals 31 and 33 in response to the first allocation setting datum 34 to produce first primary and secondary time switch output signals 35 and 36. The second time switch 10 is connected to the bandwidth allocation controlling device 11. The second time switch 10 is supplied with the first and second received signals 31 and 33 and a second allocation setting datum 37. The second time switch 10 allocates the on-demand bandwidth and the frame relay bandwidth to the first and second received signals 31 and 33 in response to the second allocation setting datum 37 to produce second primary and secondary time switch output signals 38 and 39.

The bandwidth allocation controlling device 11 is connected to the first time switch 9, the second time switch 10, the bandwidth switch controlling device 12, the first selector 13, and the second selector 14. The bandwidth allocation controlling device 11 is supplied with a second demand request signal 40 having a connectivity restriction from the on-demand terminal line. The bandwidth allocation controlling device 11 produces and renews the first and second allocation setting data 34 and 37 in response to the connectivity restriction to produce the second allocation change datum 28 to transmit the second allocation change datum 28 to the bandwidth allocation controlling device 5 of the node 1. The bandwidth allocation controlling device 11 thereafter produces the second allocation end signal 27 representing an end of producing and renewing the first and second allocation setting data 34 and 37. The bandwidth allocation controlling device 11 renews the first and second allocation setting data 34 and 37 in response to the first allocation change datum 25 from the bandwidth allocation controlling device 5 of the node 1. In this event, the bandwidth allocation controlling device 11 thereafter produces the second allocation end signal 27 to supply the second allocation end signal 27 to the bandwidth allocation controlling device 5.

The bandwidth switch controlling device 12 is connected to the bandwidth allocation controlling device 11 and the first selector 13, the second selector 14, and the first selector 7. The bandwidth switch controlling device 12 is supplied with the second allocation end signal 27 and the first switch bit of the first received signal 31. The bandwidth switch controlling device 12 produces a first switch signal 41 in response to the second allocation end signal 27. Also, the bandwidth switch controlling device 12 produces a second switch signal 42 in response to the first switch bit of the first received signal 31.

The first selector 13 is connected to the first and second time switches 9 and 10 and the bandwidth switch controlling device 12. The first selector 13 is supplied with the first and second primary time switch output signals 35 and 38 and the first switch signal 41. The first selector 13 selects one of the first and second primary time switch output signals 35 and 38 in response to the first switch signal 41 to transmit the one of the first and second primary time switch output signals 35 and 38 as a first transmitting signal 43. The second selector 14 is connected to the first and second time switches 9 and 10 and the bandwidth switch controlling device 12. The second selector 14 is supplied with the first and second secondary time switch output signals 36 and 39 and the second switch signal 42. The second selector 14 selects one of the first and second secondary time switch output signals 36 and 39 in response to the second switch signal 42 to transmit the one of the first and second secondary time switch output signals 36 and 39 as a second transmitting signal 17, namely, the second received signal 17.

Figure 2A:
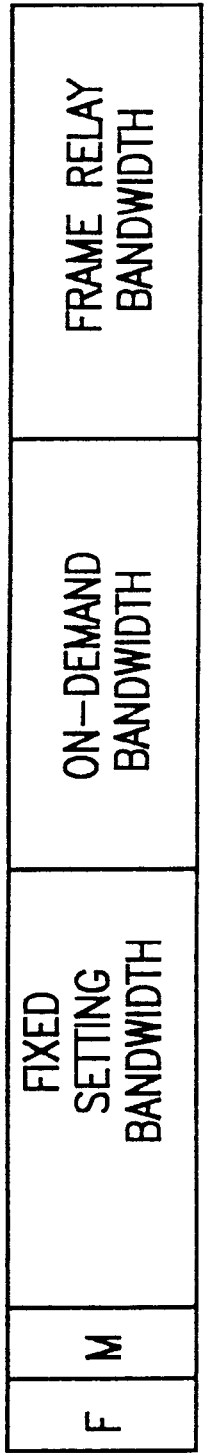
FIG. 2A is a view for use in describing a first state of bandwidth allocation of the time division multiplex transferring system illustrated in FIG. 1.
Figure 2B:
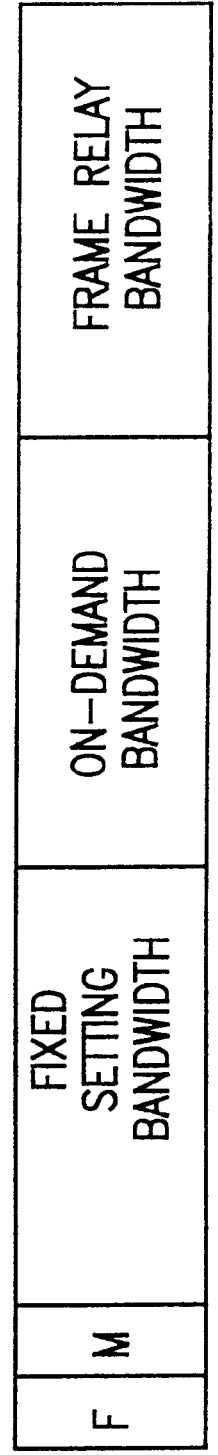
FIG. 2B is a view for use in describing a second state of bandwidth allocation of the time division multiplex transferring system illustrated in FIG. 1.
Figure 3:
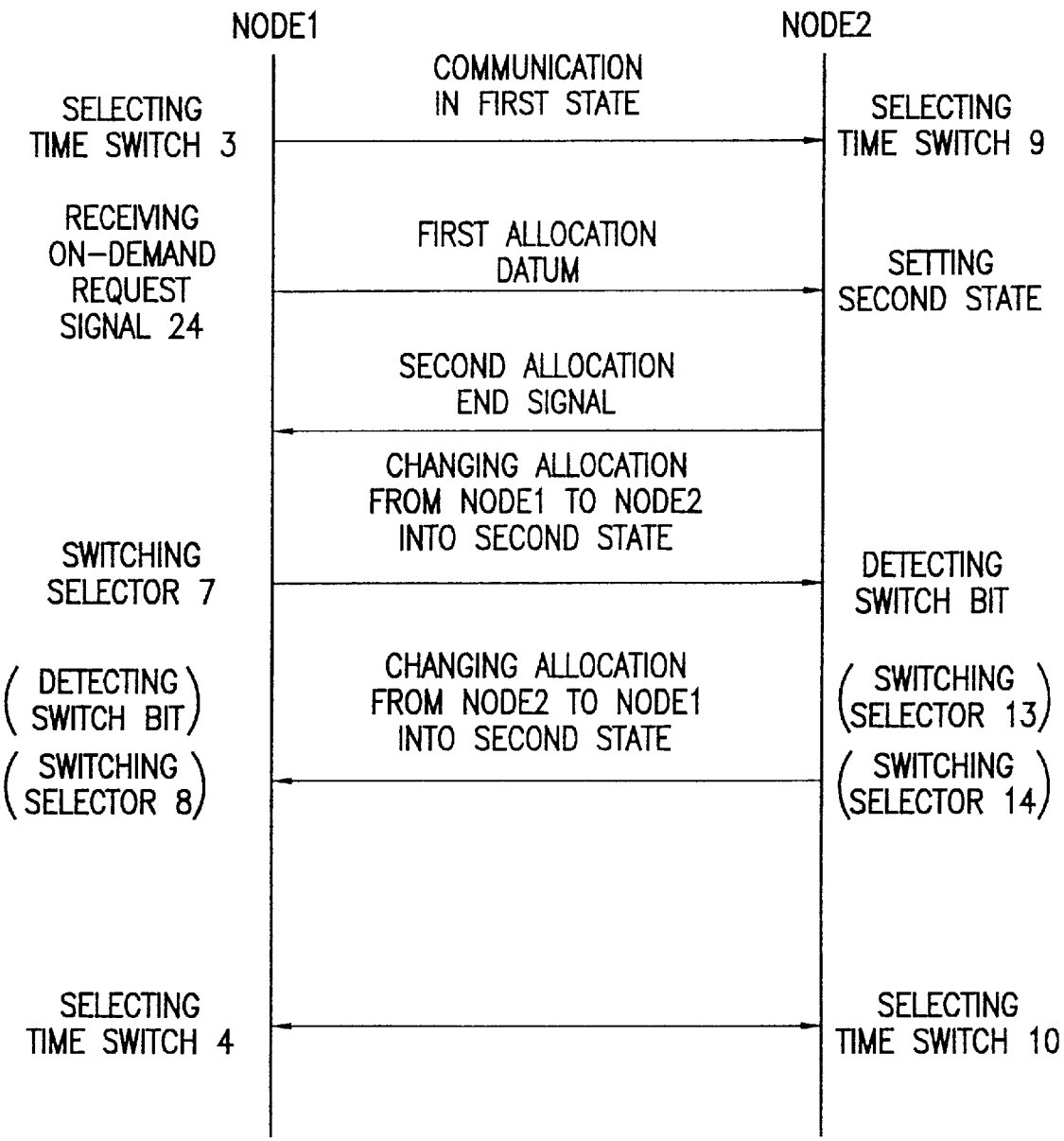
FIG. 3 is a view for use in describing operation of the time division multiplex transferring system illustrated in FIG. 1.

Referring to FIGS. 2, and 3 together with FIG. 1, the description will be made as regards concrete operation of the time division multiplex transferring system.

FIGS. 2A and 2B, show first and second states of concrete bandwidth allocation of the time division multiplex transferring system. Each of the first and second states of concrete bandwidth allocation comprises a frame pattern bit F, a switch bit M, the fixed setting bandwidth, the on-demand bandwidth, and the frame relay bandwidth. The frame pattern bit F is for synchoronizing the frames. The switch bit M is for synchoronizing the switch of bandwidth allocation between both of the nodes 1 and 2. It is assumed that the first allocation datum is set at the first state of concrete bandwidth allocation shown in FIG. 2A. It is assumed that the second allocation datum is set at the second state of concrete bandwidth allocation shown in FIG. 2B. It is assumed that the first and second selectors 7 and 8 of the node 1 select the first primary and secondary time switch output signals 19 and 20. It is assumed that the first and second selectors 13 and 14 of the node 2 select the first primary and secondary time switch output signals 33 and 34.

As shown in FIG. 3, in the node 1, when the bandwidth allocation controlling device 5 is supplied with the first demand request signal 24, the allocation controlling device 5 produces the second allocation setting datum 18 in response to the connectivity restriction of the first demand request signal 24 to supply the second allocation setting datum 18 to the second time switch 4 and to set the second state shown in FIG. 2B. At the same time, the allocation controlling device 5 transmits the first allocation change datum 25 to the allocation controlling device 11. The allocation controlling device 11 produces the second allocation setting datum 35 in response to the first allocation change datum 25 to supply the the second allocation setting datum 35 to the second time switch 10 and to set the second state shown in FIG. 2B. The allocation controlling device 11 thereafter produces and supplies the second allocation end signal 27 to the allocation controlling device 5. The transfer of the data is carried out by control bandwidths of the fixed setting bandwidth.

Next, when the bandwidth switch controlling device 6 is supplied with the first end first allocation end signal 26 form the allocation controlling device 5, the bandwidth switch controlling device 6 makes the first selector 7 select the second primary time switch output signal 22 to change the bandwidth from node 1 to node 2 to the second state shown in FIG. 2B and to change, at the same time, the switch bit M (from 0 to 1). In the node 2, the bandwidth switch controlling device 12 detects a change of the switch bit M of the first received signal 31 to make the first and second selectors 13 and 14 select the first and second secondary time switch output signals 36 and 37, respectively. When the second selector 14 selects the second secondary time switch output signals 37, the second selector 14 sets the bandwidth from node 2 to node 1 to the second state shown in FIG. 2B. In this event, the bandwidth switch controlling device 6 detects a change of the switch bit M of the second received signal 17 to make the second selector 8 select the second secondary time switch output signals 23.

In addition, when the bandwidth allocation is changed, namely, when the selectors switch the first primary and secondary signals into the first and second secondary time switch output signals, a controlling process, for example, a process of changing a communication rate to the frame relay line in response to change of the on-demand bandwidth is carried out.

Figure 4:
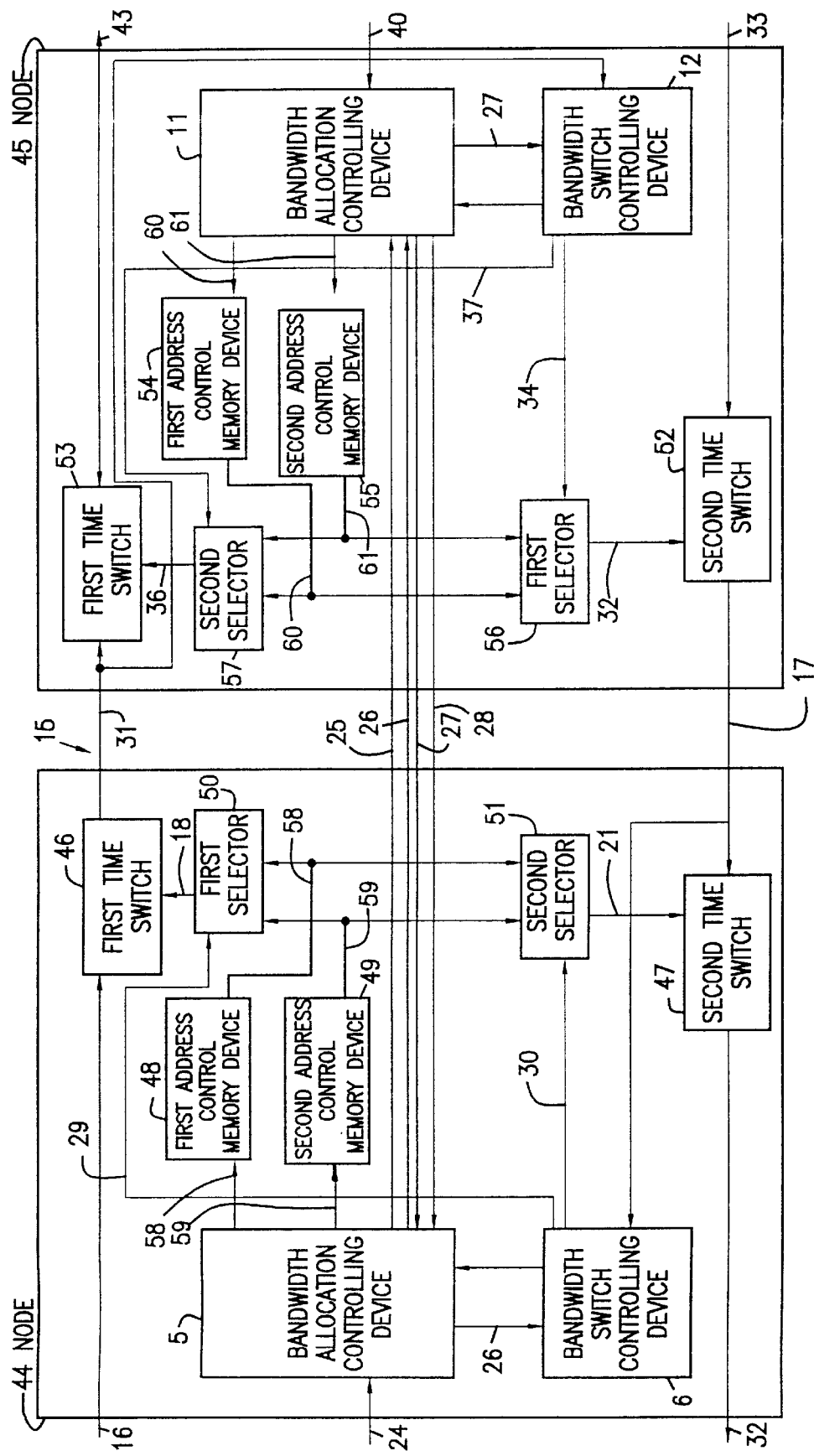
FIG. 4 is a block diagram of a time division multiplex transferring system according to a second embodiment of this invention.

Referring to FIG. 4. the description will proceed to a time division multiplex transferring system according to a second embodiment of this invention. Similar parts are designated by like reference numerals.

The time division multiplex transferring system uses the fixed setting bandwidth, the on-demand bandwidth, and the frame relay bandwidth. The time division multiplex transferring system comprises a node 44 and a counter node 45 which is similar to the node 44. The node 44 comprises a first time switch 46, a second time switch 47, a first address control memory device 48, a second address control memory device 49, the bandwidth allocation controlling device 5, the bandwidth switch controlling device 6, a first selector 50, and a second selector 51. The counter node 45 is connected to the node 44 through the transferring lines 15. The counter node 45 is similar to the node 44. The counter node 45 comprises a first time switch 52, a second time switch 53, a first address control memory device 54, a second address control memory device 55, the bandwidth allocation controlling device 11, the bandwidth switch controlling device 12, a first selector 56, and a second selector 57.

The first time switch 46 is supplied with the first received signal 16 having the first switch bit and a first allocation setting datum 18. The first time switch 46 allocates the on-demand bandwidth and the frame relay bandwidth to the first received signal 16 in response to the first allocation setting datum 18 to produce and transmit a first time switch output signal as a first transmitting signal 31. The second time switch 47 is supplied with the second received signal 17 and a second allocation setting datum 21. The second time switch 47 allocates the on-demand bandwidth and the frame relay bandwidth to the second received signal 17 in response to the second allocation setting datum 21 to produce and transmit a second time switch output signal 32 as a second transmitting signal 32.

The first address control memory device 48 holds a primary allocation setting datum 58. The second address control memory device 49 holds a secondary allocation setting datum 59. The bandwidth allocation controlling device 5 is supplied with the demand request signal 24 having the connectivity restriction. The bandwidth allocation controlling device 5 produces and renews the primary and secondary allocation setting data 58 and 59 in response to the connectivity restriction to set the primary and secondary allocation setting data 58 and 59 to the first and second address control memory devices 48 and 49, respectively. The bandwidth allocation controlling device 5 produces a first allocation change datum 25 to transmit the first allocation change datum 25 to the bandwidth allocation controlling device 11 of the counter node 45. The bandwidth allocation controlling device 5 thereafter produces the first allocation end signal 26 representing the end of setting the primary and secondary allocation setting data 58 and 59 when the bandwidth allocation controlling device 5 is supplied with the second allocation end signal 27 from the bandwidth allocation controlling device 11. The bandwidth allocation controlling device 5 renews the primary and secondary allocation setting data 58 and 59 of the first and second address control memory devices 48 and 49 in response to a second allocation change datum 28 from the bandwidth allocation controlling device 11.

The bandwidth allocation controlling device 5 thereafter produces the first allocation end signal 26 to supply the first allocation end signal 26 to the bandwidth allocation controlling device 11 and the bandwidth switch controlling device 6.

The bandwidth switch controlling device 6 is supplied with the first allocation end signal 26 and the second switch bit of the second received signal 17. The bandwidth switch controlling device 6 produces the first switch signal 29 in response to the first allocation end signal 26. The bandwidth switch controlling device 6 produces the second switch signal 30 in response to the second switch bit of the second received signal 17.

The first selector 50 is supplied with the primary and secondary allocation data 58 and 59 from the first second address control memory devices 48 and 49 and the first switch signal 29. The first selector 50 selects one of the primary and secondary allocation data 58 and 59 in response to the first switch signal 29 to supply the one of the primary and secondary allocation data 58 and 59, as the first allocation datum 18, to the first time switch 46. The second selector 47 is supplied with the primary and secondary allocation data 58 and 59 from the first second address control memory devices 48 and 49 and the second switch signal 30. The second selector 47 selects one of the primary and secondary allocation data 58 and 59 in response to the second switch signal 30 to supply the one of the primary and secondary allocation data 58 and 59, as the second allocation datum 21, to the second time switch 47.

The first time switch 52 is supplied with the first received signal 33 having the first switch bit and a first allocation setting datum 32. The first time switch 52 allocates the on-demand bandwidth and the frame relay bandwidth to the first received signal 33 in response to the first allocation setting datum 32 to produce and transmit a first time switch output signal as a first transmitting signal 17, namely, the second received signal 17. The second time switch 53 is supplied with a second received signal 31, namely, the first transmitting signal 31 and a second allocation setting datum 36. The second time switch 53 allocates the on-demand bandwidth and the frame relay bandwidth to the second received signal 31 in response to the second allocation setting datum 36 to produce and transmit a second time switch output signal 43 as a second transmitting signal 43.

The first address control memory device 54 holds a primary allocation setting datum 60. The second address control memory device 55 holds a secondary allocation setting datum 61. The bandwidth allocation controlling device 11 is supplied with the second demand request signal 40 having the connectivity restriction. The bandwidth allocation controlling device 11 produces and renews the primary and secondary allocation setting data 60 and 61 in response to the connectivity restriction to set the primary and secondary allocation setting data 60 and 61 to the first and second address control memory devices 54 and 55, respectively. The bandwidth allocation controlling device 11 produces the second allocation change datum 28 to transmit the first allocation change datum 28 to the bandwidth allocation controlling device 5 of the node 44.

The bandwidth allocation controlling device 11 thereafter produces the second allocation end signal 27 representing the end of setting the primary and secondary allocation setting data 60 and 61 when the bandwidth allocation controlling device 11 is supplied with the first allocation end signal 26 from the bandwidth allocation controlling device 5. The bandwidth allocation controlling device 11 renews the primary and secondary allocation setting data 60 and 61 of the first and second address control memory devices 54 and 55 in response to the first allocation change datum 25 from the bandwidth allocation controlling device 5. The bandwidth allocation controlling device 11 thereafter produces the second allocation end signal 27 to supply the second allocation end signal 27 to the bandwidth allocation controlling device 5 and the bandwidth switch controlling device 12.

The bandwidth switch controlling device 12 is supplied with the second allocation end signal 27 and the second switch bit of the second received signal 31, namely, the first transmitting signal 31. The bandwidth switch controlling device 12 produces the first switch signal 34 in response to the second allocation end signal 27. The bandwidth switch controlling device 12 produces the second switch signal 37 in response to the second switch bit of the second received signal 31.

The first selector 56 is supplied with the primary and secondary allocation data 60 and 61 from the first second address control memory devices 54 and 55 and the first switch signal 34. The first selector 56 selects one of the primary and secondary allocation data 60 and 61 in response to the first switch signal 34 to supply the one of the primary and secondary allocation data 60 and 61, as the first allocation datum 32, to the first time switch 52. The second selector 57 is supplied with the primary and secondary allocation data 60 and 61 from the first second address control memory devices 54 and 55 and the second switch signal 37. The second selector 57 selects one of the primary and secondary allocation data 60 and 61 in response to the second switch signal 37 to supply the one of the primary and secondary allocation data 60 and 61, as the second allocation datum 36, to the second time switch 57.

Figure 5:
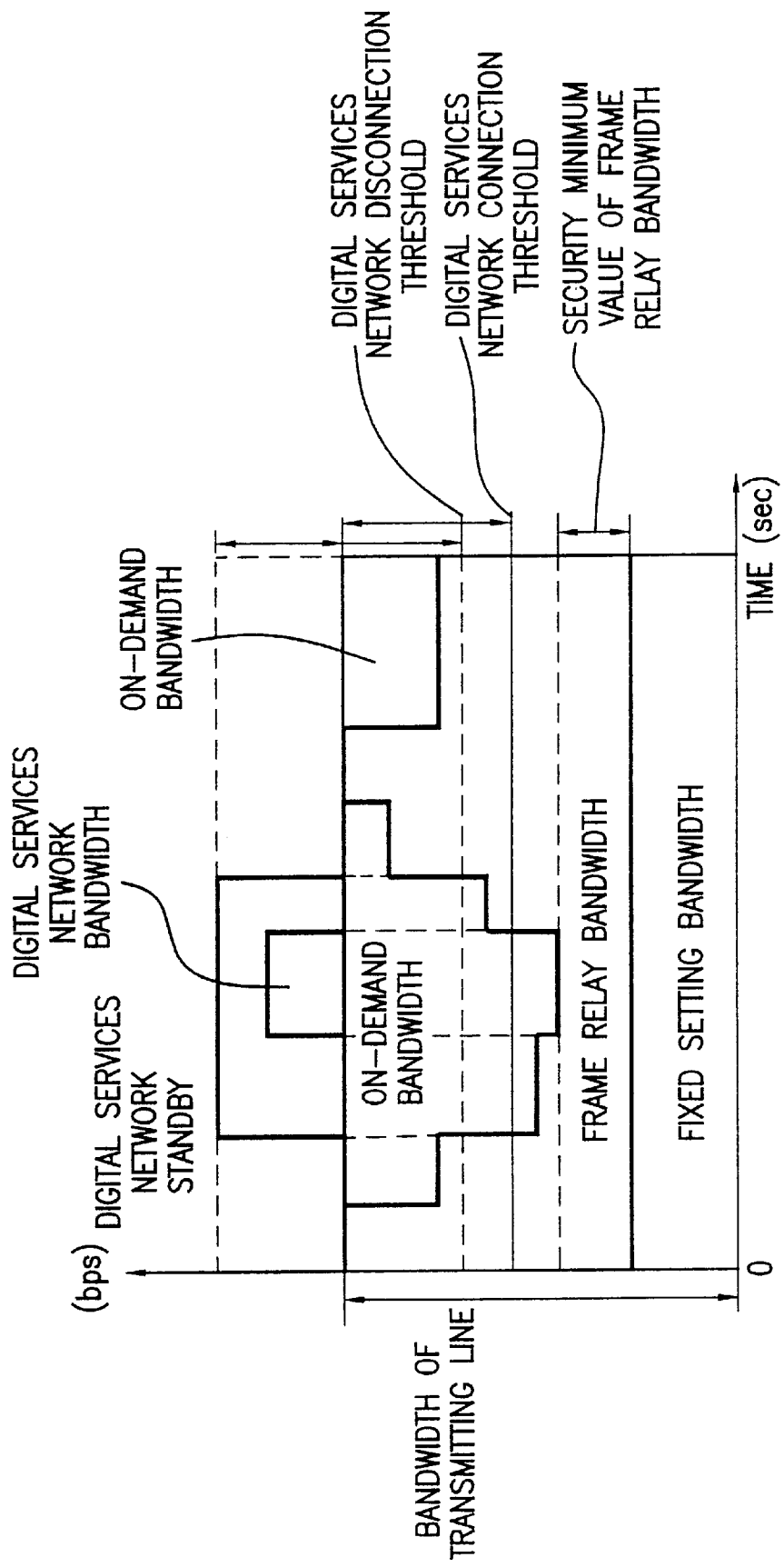
FIG. 5 is a view for use in describing operation of a time division multiplex transferring system according to a third embodiment of this invention.

Referring to FIG. 5, the description will proceed to a time division multiplex transferring system according to a third embodiment of this invention. Similar parts are designated by like reference numerals.

The time division multiplex transferring system further comprises a predetermined digital services bandwidth such as 64 kilobits/sec, for a digital services network (not shown) in the time division multiplex transferring system illustrated in FIGS. 1 to 4. The bandwidth allocation controlling device is supplied with the demand request signal having the connectivity restriction. The bandwidth allocation controlling device produces and renews the first and second (or primary and secondary) allocation setting data in response to the connectivity restriction to allocate the on-demand bandwidth and the frame relay bandwidth by determining a ratio of the on-demand bandwidth and the frame relay bandwidth, to predetermine that the on-demand bandwidth has a maximum value at a security minimum value of the frame relay bandwidth, and to allocate a portion of the on-demand bandwidth that is greater than the maximum value of the on-demand bandwidth to the predetermined digital services bandwidth. The bandwidth allocation controlling device thereafter produces the allocation end signal.

For example, in FIG. 5, when the on-demand bandwidth is increased with the lapse of time and becomes greater than the security minimum value of the frame relay bandwidth, namely, the maximum value of the on-demand bandwidth, a portion of the on-demand bandwidth that is greater than the maximum value of the on-demand bandwidth is allocated to the predetermined digital services bandwidth. When the on-demand bandwidth is increased with the lapse of time and reaches an digital services network connection threshold, connection process of the digital services network is carried and the digital services network becomes on standby. Also, when the on-demand bandwidth is decreased with the lapse of time form a state of use of the digital services network and reaches a digital services network disconnection threshold, the digital services network is disconnected.

While this invention has thus far been described in conjunction with a few embodiments thereof, it will readily be possible for those skilled in the art to put this invention into practice in various other manners. For example, the second selectors 8 and 14 may be omitted. Also, the second selectors 51 and 57 may be omitted.

What is claimed is:

1. A time division multiplex transferring system which uses a fixed setting bandwidth, an on-demand bandwidth, and a frame relay bandwidth, said fixed setting bandwidth being used for a dedicated terminal line in which traffic does not change, said on-demand bandwidth being used for an on-demand terminal line in which said traffic changes, said frame relay bandwidth being used for a frame relay terminal line in which said traffic changes, said time division multiplex transferring system comprising:

allocating means for allocating said on-demand bandwidth and said frame relay bandwidth by determining a ratio of said on-demand bandwidth and said frame relay bandwidth in response to a connectivity restriction from said on-demand terminal line.

2. A time division multiplex transferring system as claimed in claim 1, wherein said time division multiplex transferring system further comprises a predetermined digital services bandwidth for a digital service network, said allocating means allocating said on-demand bandwidth and said frame relay bandwidth by determining said ratio of said on-demand bandwidth and said frame relay bandwidth, said allocating means predetermining that said on-demand bandwidth has a maximum value at a security minimum value of said frame relay bandwidth, said allocating means allocating a portion of said on-demand bandwidth that is greater than said maximum value of said on-demand bandwidth to said predetermined digital services.

3. A time division multiplex transferring system which uses a fixed setting bandwidth, an on-demand bandwidth, and a frame relay bandwidth, said fixed setting bandwidth being used for a dedicated terminal line in which traffic does not change, said on-demand bandwidth being used for an on-demand terminal line in which said traffic changes, said frame relay bandwidth being used for a frame relay terminal line in which said traffic changes, said time division multiplex transferring system comprising a node which comprises:

a first time switch supplied with a received signal and a first allocation setting datum for allocating said on-demand bandwidth and said frame relay bandwidth to said received signal in response to said first allocation setting datum to produce a first time switch output signal;

a second time switch supplied with said received signal and a second allocation setting datum for allocating said on-demand bandwidth and said frame relay bandwidth to said received signal in response to said second allocation setting datum to produce a second time switch output signal;

a bandwidth allocation controlling device supplied with a demand request signal having a connectivity restriction for producing and renewing said first and second allocation setting data in response to said connectivity restriction and thereafter producing an allocationend signal representing an end of producing and renewing said first and second allocation setting data;

a bandwidth switch controlling device supplied with said allocation end signal for producing a switch signal; and a selector supplied with said first and second time switch output signals and said switch signal for selecting one of said first and second time switch output signals in response to said switch signal to transmit the one of said first and second time switch output signals as a transmitting signal.

4. A time division multiplex transferring system as claimed in claim 3, wherein said time division multiplex transferring system further comprises a predetermined digital services bandwidth for a digital services network, said bandwidth allocation controlling device supplied with said demand request signal having said connectivity restriction for producing and renewing said first and second allocation setting data in response to said connectivity restriction to allocate said on-demand bandwidth and said frame relay bandwidth by determining a ratio of said on-demand bandwidth and said frame relay bandwidth, to predetermine that said on-demand bandwidth has a maximum value at a security minimum value of said frame relay bandwidth, and to allocate a portion of said on-demand bandwidth that is greater than said maximum value of said on-demand bandwidth to said predetermined digital services bandwidth, said bandwidth allocation controlling device thereafter producing said allocation end signal.

5. A time division multiplex transferring system which uses a fixed setting bandwidth, an on-demand bandwidth, and a frame relay bandwidth, said fixed setting bandwidth being used for a dedicated terminal line in which traffic does not change, said on-demand bandwidth being used for an on-demand terminal line in which said traffic changes, said frame relay bandwidth being used for a frame relay terminal line in which said traffic changes, said time division multiplex transferring system comprising a node and a counter node which is similar to said node, said node comprising:

a first time switch supplied with a first received signal having a first switch bit, a second received signal having a second switch bit, and a first allocation setting datum for allocating said on-demand bandwidth and said frame relay bandwidth to said first and second received signals in response to said first allocation setting datum to produce first primary and secondary time switch output signals;

a second time switch supplied with said first and second received signals and a second allocation setting datum for allocating said on-demand bandwidth and said frame relay bandwidth to saidfirst and second received signals in response to said second allocation setting datum to produce second primary and secondary time switch output signals;

a bandwidth allocation controlling device supplied with a demand request signal having a connectivity restriction for producing and renewing said first and second allocation setting data in response to said connectivity restriction to produce a first allocation change datum to transmit said first allocation change datum to said counter node, said bandwidth allocation controlling device thereafter producing a first allocation end signal representing an end of producing and renewing said first and second allocation setting data when said bandwidth allocation controlling device is supplied with a second allocation end signal from said counter node, said bandwidth allocation controlling device renewing said first and second allocation setting data in response to a second allocation change datum from said counter node and thereafter producing said first allocation end signal to supply said first allocation end signal to said counter node;

a bandwidth switch controlling device supplied with said first allocation end signal and said second switch bit of said second received signal for producing a first switch signal in response to said first allocation end signal and for producing a second switch signal in response to said second switch bit;

a first selector supplied with said first and second primary time switch output signals and said first switch signal for selecting one of said first and second primary time switch output signals in response to said first switch signal to transmit the one of said first and second primary time switch output signals as a first transmitting signal; and a second selector supplied with said first and second secondary time switch output signals and said second switch signal for selecting one of said first and second secondary time switch output signals in response to said second switch signal to transmit the one of said first and second secondary time switch output signals as a second transmitting signal.

6. A time division multiplex transferring system as claimed in claim 5, wherein said time division multiplex transferring system further comprises a predetermined digital services bandwidth for a digital services network, said bandwidth allocation controlling device supplied with said demand request signal having said connectivity restriction for producing and renewing said first and second allocation setting data in response to said connectivity restriction to allocate said on-demand bandwidth and said frame relay bandwidth by determining a ratio of said on-demand bandwidth and said frame relay bandwidth, to predetermine that said on-demand bandwidth has a maximum value at a security minimum value of said frame relay bandwidth, and to allocate a portion of said on-demand bandwidth that is greater than said maximum value of said on-demand bandwidth to said predetermined digital services bandwidth, said bandwidth allocation controlling device thereafter producing said first allocation end signal.

7. A time division multiplex transferring system which uses a fixed setting bandwidth, an on-demand bandwidth, and frame relay bandwidth, said fixed setting bandwidth being used for a dedicated terminal line in which traffic does not change, said on-demand bandwidth being used for an on-demand terminal line in which said traffic changes, said frame relay bandwidth being used for a frame relay terminal line in which said traffic changes, said time division multiplex transferring system comprising a node which comprises:

a time switch supplied with a received signal and an allocation setting datum for allocating said on-demand bandwidth and said frame relay bandwidth to said received signal in response to said first allocation setting datum to produce and transmit a time switch output signal as a transmitting signal;

a first address control memory device for holding a primary allocation setting datum;

a second address control memory device for holding a secondary allocation setting datum;

a bandwidth allocation controlling device supplied with a demand request signal having a connectivity restriction for producing and renewing said primary and secondary allocation setting data in response to said connectivity restriction to set said primary and secondary allocation setting data to said first address control memory devices, respectively, said bandwidth allocation controlling device thereafter producing an allocation end signal representing an end of setting said first and second allocation setting data;

a bandwidth switch controlling device supplied with said allocation end signal for producing a switch signal; and a selector supplied with said primary and secondary allocation setting data from said first and second address control memory devices and said switch signal for selecting one of said first and second allocation setting data in response to said switch signal to supply the one of said first and second allocation setting data, as said allocation setting datum, to said time switch.

8. A time division multiplex transferring system as claimed in claim 7, wherein said time division multiplex transferring system further comprises a predetermined digital services bandwidth for a digital services network, said bandwidth allocation controlling device supplied with said demand request signal having said connectivity restriction for producing and renewing said primary and secondary allocation setting data in response to said connectivity restriction to allocate said on-demand bandwidth and said frame relay bandwidth by determining a ratio of said on-demand bandwidth and said frame relay bandwidth, to predetermine that said on-demand bandwidth has a maximum value at a security minimum value of said frame relay bandwidth, and to allocate a portion of said on-demand bandwidth that is greater than said maximum value of said on-demand bandwidth to said predetermined digital services bandwidth, said bandwidth allocation controlling device thereafter producing said allocation end signal.

9. A time division multiplex transferring system which uses a fixed setting bandwidth, an on-demand bandwidth, and a frame relay bandwidth, said fixed setting bandwidth being used for a dedicated terminal line in which traffic does not change, said on-demand bandwidth being used for an on-demand terminal line in which said traffic changes, said frame relay bandwidth being used for a frame relay terminal line in which said traffic changes, said time division multiplex transferring system comprising a node and a counter node which is similar to said node, said node comprising:

a first time switch supplied with a first received signal having a first switch bit and a first allocation setting datum for allocating said on-demand bandwidth and said frame relay bandwidth to said first received signal in response to said first allocation setting datum to produce and transmit a first time switch output signal as a first transmitting signal;

a second time switch supplied with a second received signal and a second allocation setting datum for allocating said on-demand bandwidth and said frame relay bandwidth to said second received signal in response to said second allocation setting datum to produce and transmit a second time switch output signal as a second transmitting signal;

a first address control memory device for holding a primary allocation setting datum;

a second address control memory device for holding a secondary allocation setting datum;

a bandwidth allocation controlling device supplied with a demand request signal having a connectivity restriction for producing and renewing said primary and secondary allocation setting data in response to said connectivity restriction to set said primary and secondary allocation setting data to said first and second address control memory devices, respectively, to produce a first allocation change datum to transmit said first allocation change datum to said counter node, said bandwidth allocation controlling device thereafter producing a first allocation end signal representing an end of setting said primary and secondary allocation setting data when said bandwidth allocation controlling device is supplied with a second allocation end signal from said counter node, said bandwidth allocation controlling device renewing said primary and secondary allocation setting data of said first and second address control memory devices in response to a second allocation change datum from said counter node and thereafter producing said first allocation end signal to supply said first allocation end signal to said counter node;

a bandwidth switch controlling device supplied with said first allocation end signal and said second switch bit of said second received signal for producing a first switch signal in response to said first allocation end signal and for producing a second switch signal in response to said second switch bit;

a first selector supplied with said primary and secondary allocation data from said first and second address control memory devices and said first switch signal for selecting one of said primary and secondary allocation data in response to said first switch signal to supply the one of said primary and secondary allocation data, as said first allocation datum, to said first time switch; and a second selector supplied with said primary and secondary allocation data from said first and second address control memory devices and said second switch signal for selecting one of said primary and secondary allocation data in response to said second switch signal to supply the one of said primary and secondary allocation data, as said second allocation datum, to said second time switch.

10. A time division multiplex transferring system as claimed in claim 9, wherein said time division multiplex transferring system further comprising a predetermined digital services bandwidth for a digital services network, said bandwidth allocation controlling device supplied with said demand request signal having said connectivity restriction for producing and renewing said primary and secondary allocation setting data in response to said connectivity restriction to allocate said on-demand bandwidth and said frame relay bandwidth by determining a ratio of said on-demand bandwidth and said frame relay bandwidth, to predetermine that said on-demand bandwidth has a maximum value at a security minimum value of said frame relay bandwidth, and to allocate a portion of said on-demand bandwidth that is greater than said maximum value of said on-demand bandwidth to said predetermined digital services bandwidth, said bandwidth allocation controlling device thereafter producing said first allocation end signal.

* * * * *